(No Model.)

M. S. O'NEIL.
HARROW.

No. 338,768. Patented Mar. 30, 1886.

Attest
Carl Spengel
W. S. Hartley

Inventor
Michael S. O'Neil
By Harper & Blakemore Attys.

UNITED STATES PATENT OFFICE.

MICHAEL S. O'NEIL, OF ROCK ISLAND, ILLINOIS.

HARROW.

SPECIFICATION forming part of Letters Patent No. 338,768, dated March 30, 1886.

Application filed March 30, 1885. Serial No. 160,714. (No model.)

*To all whom it may concern:*

Be it known that I, MICHAEL S. O'NEIL, of Rock Island, in the county of Rock Island and State of Illinois, have invented certain new and useful Improvements in Harrows, of which the following is a specification.

My invention relates to certain new and useful improvements in that c'ass of harrows known as "combined sharp and smoothing" harrows—that is, such as will admit of the machine being used as a regular straight-tooth harrow or as a smoothing-harrow, depending upon the end to which the draft is applied; and it consists in a novel construction of the teeth, as hereinafter set forth.

My invention may be applied to a single harrow or one made in sections. For the purposes of the present application I will illustrate and describe the same with reference to its embodiment in a single-section harrow. Two or more of these sections may be linked, strapped, or otherwise secured together in a double, triple, or quadruple section harrow by any of the known or usual methods, as the judgment of the manufacturer or the uses to which the device is put may dictate or render advisable.

Figure 1:
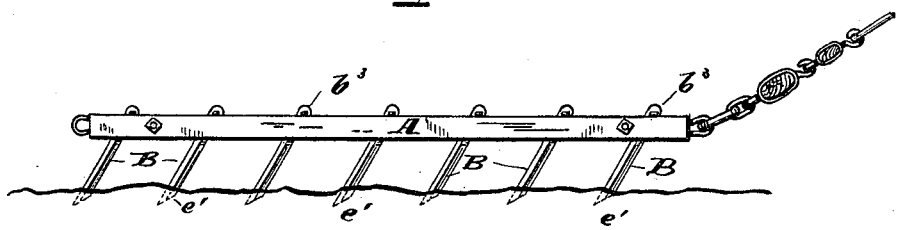
Figure 2:
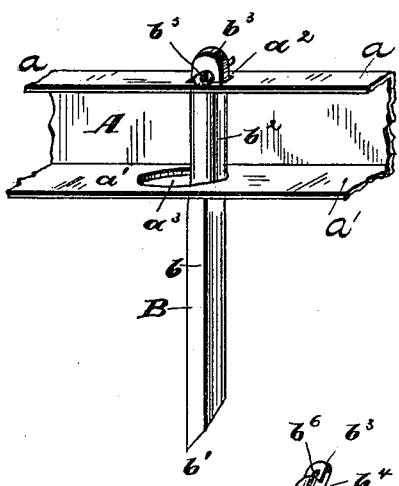
Figure 3:
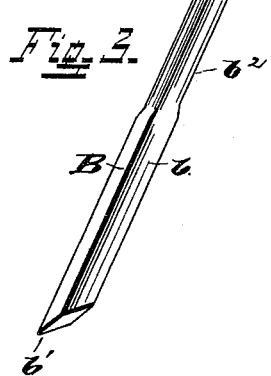

In the drawings, Figure 1 is a side view of a harrow embodying my invention. Fig. 2 is an enlarged perspective view of a portion of a harrow-beam with a harrow-tooth, showing the construction of the tooth and mode of adjustment to the beam. Fig. 3 is a detail view of a harrow-tooth.

A is one of the beams of a harrow, constructed, as shown, with a flat vertical portion, and top and bottom bent at right angles to such vertical portion in the same direction, forming top and bottom flanges, $a$ $a'$, thereto, respectively. This form of beam adds very little to its weight or cost over a single-flanged beam, while greatly increasing its strength and durability, and affording convenient means for the adjustment of the teeth. The upper flanges of the beams have narrow slits or openings $a^2$ at regular intervals to receive the tenoned head of the teeth, and the lower flanges are provided with angular slots $a^3$, corresponding in number and position to the slits in the upper one, the purposes of such slots being to allow to the teeth longitudinal play therein, so that they may strike the ground in an upright or slanting position, and thus permit the harrow to be used as a sharp or smooth one, as the operator may desire or the condition of the soil may render expedient, according to which end of the machine the draft is applied. For instance, with draft at one end the harrow will be a sharp one; reversed, its action upon the soil will be that of a smoothing-harrow.

B is my improved harrow-tooth, its body portion $b$ constructed in a diamond form, cut down to a sharp point, $b'$, at its lower end, its greater length in front, and its upper portion, $b^2$, rounded into an oval form. The upper end of the tooth is made with a slight tenon, $b^3$, the shoulders $b^4$ of which are slightly rounded to front and rear. The teeth are adjusted to the beams by inserting the oval portions thereof in the slots in the lower flanges of the beam up through the space between the flanges, and placing the tenons in the slits in the upper flanges of the beam, beyond which they are secured from withdrawal by pins $b^5$, passing through perforation $b^6$ in said tenons. By this adjustment of the teeth their removal from or displacement on the beams when the harrow is in operation is rendered impossible, except by such a strain upon or wrenching of the teeth as is the result of gross carelessness on the part of the operator, against which no provision can ever be made. Their dropping out of the slits in the upper flanges is prevented by pins placed through the perforation in the tenons, and their tendency to be thrust upward by the ordinary resistance of the ground is overcome by the contact of the shoulders of the tenoned portion with the lower faces of the upper flanges. The shoulders of the tenoned portion of the teeth being made rounding from front to rear, the teeth rock thereupon with easy motion when playing along the slots in the lower flanges of the beams.

I have not thought it necessary to describe any method of securing the several harrow-beams together, or any means whereby the space between the several beams may be preserved, or of any device for making the draft attachments thereto, for the reason that such details of construction are not within the purview of my invention.

I do not limit myself to the precise method of adjusting the teeth to the beam herein described, but may attach them thereto by keys or rivets or in any other suitable manner.

My improvement may be made available upon the frames of many harrows in common use and well known to the trade at this time, and upon many others, by some slight changes in the construction of the frame-work, which will readily occur to any ordinarily skilled mechanic.

I am aware that combined sharp and smoothing harrows have heretofore been made, and I do not claim such combination, broadly; but the peculiar form of tooth and beam herein described and the mode of adjusting one to the other are new.

I am aware that it is not new to provide slots in the webs or flanges of a harrow-beam to receive the tooth and allow for movements of the latter; and I also wish it to be understood that I make no broad claim to a harrow-tooth having a tenoned upper end.

I claim—

1. A harrow-tooth consisting of a single straight bar of metal or other suitable material with a diamond-shaped body portion cut down to a point at its bottom, an oval or rounded upper portion, and tenoned upper end with perforation therein.

2. In a harrow, the combination of a harrow-tooth beam having a vertical body portion, and upper and lower flanges at right angles thereto extending in the same direction, with slits in the upper and angular slots in the lower flange, with a series of harrow-teeth, each consisting of a single straight piece of metal or other suitable material, with a diamond-shaped body portion cut down to a point at its lower end, oval or rounded upper portion, and tenoned upper end with perforation in such tenon, substantially as described.

3. In combination with a harrow-frame, a metallic tooth having its upper portion rounded in cross-section, its lower portion angular in cross-section, and its upper end tenoned and perforated, as shown.

MICHAEL S. O'NEIL.

Witnesses:
J. B. SEBLE,
HENRY RETISHER.